Dec. 17, 1968  K. H. SPENCER  3,416,816
CARGO SECURING MEANS
Filed March 10, 1967  2 Sheets-Sheet 1

INVENTOR
KENNETH H. SPENCER
BY
ATTORNEYS

Dec. 17, 1968    K. H. SPENCER    3,416,816
CARGO SECURING MEANS
Filed March 10, 1967    2 Sheets-Sheet 2
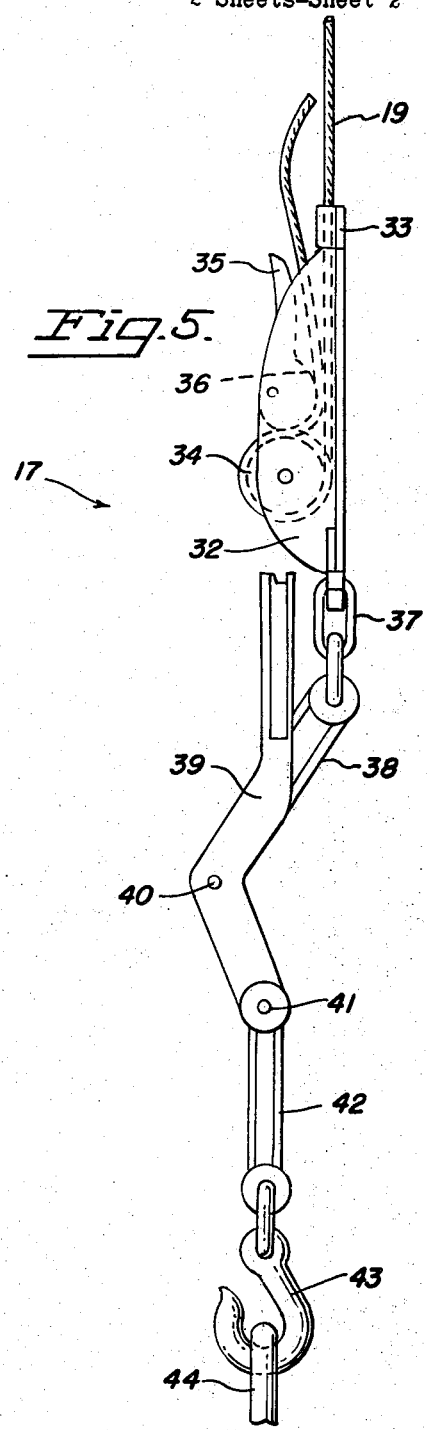
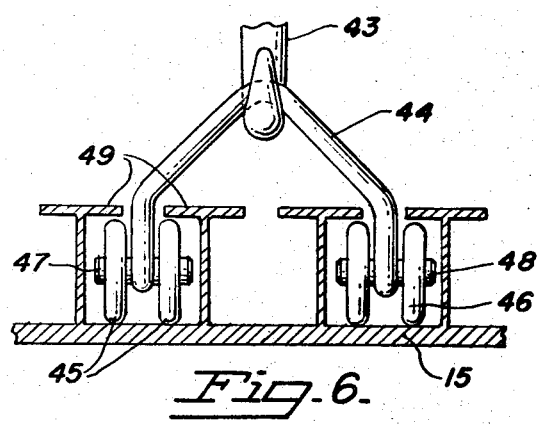
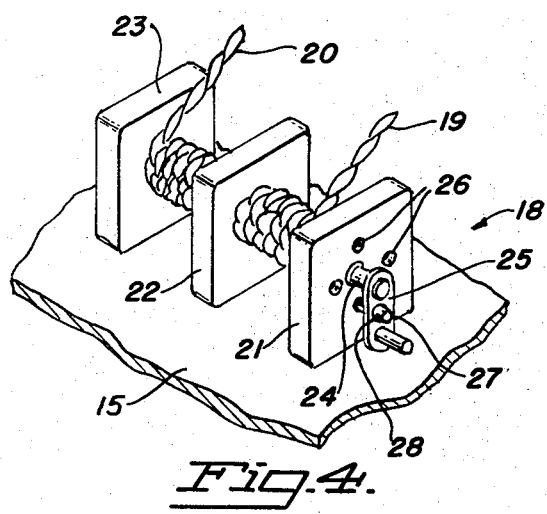
INVENTOR
KENNETH H. SPENCER
ATTORNEYS

United States Patent Office 3,416,816
Patented Dec. 17, 1968

3,416,816
CARGO SECURING MEANS
Kenneth H. Spencer, Penryn, Calif., assignor to Beckett Manufacturing Co., Penryn, Calif., a corporation of California
Filed Mar. 10, 1967, Ser. No. 622,131
8 Claims. (Cl. 280—179)

ABSTRACT OF THE DISCLOSURE

A plurality of cables are suitably arranged to pass over a cargo of stacked boxes or the like and to be tightened against a movable wall member to secure the cargo in a transport vehicle. A cable securing and tightening means comprising a cam-type clamp and an overcenter toggle mechanism is connected to each cable and adjustably arranged in the vehicle to adapt the cables to various cargo arrangements. It should be understood that this abstract shall not be used for interpreting the scope of the invention disclosed and claimed hereinafter.

Background of the invention

Numerous cable and belt arrangements have been proposed for securing a cargo of stacked boxes or the like in a transport vehicle such as a truck-trailer, railroad car or water-going vessel. Such securance is required during transit to prevent cargo breakage and/or cargo shifting. The latter condition, if sufficiently severe, could cause the trailer or the like to overturn. It is further desirable to provide a cargo securing means which is inexpensive to manufacture and install and designed for expeditious adjustment to accommodate various cargo arrangements.

U.S. Patent No. 2,760,445, issued to E. S. Beckett, for "Load Compacting Means for Cargo Space," discloses a prior art cargo securing means useful for a number of cargo transport applications.

Summary of the invention

The cargo securing means of this invention comprises at least one cable or belt member adapted to be arranged to secure a stacked cargo in a truck-trailer or other transport vehicle. The cable is preferably arranged to urge a movable wall member against the cargo to positively position and secure the cargo in place during transportation. The securing means preferably comprises cable clamping and tensioning means connected between the cable and the floor of the trailer to place the cable under a predetermined tension. The floor may comprise a plurality of longitudinally extending guide means, preferably rails, mounted thereon to facilitate adjustment of the securing means to accommodate various cargo arrangements.

Brief description of the drawings

FIG. 4 is an isometric view of a cable winch employed in the cargo securing means illustrated in FIGS. 1 and 2;

FIG. 5 is an enlarged, elevational view of cable clamping and tensioning means employed in the cargo securing means illustrated in FIG. 1; and FIG. 6 is an enlarged view taken in the direction of arrows 6—6 in FIG. 1.

Description of the preferred embodiment

Figure 1:
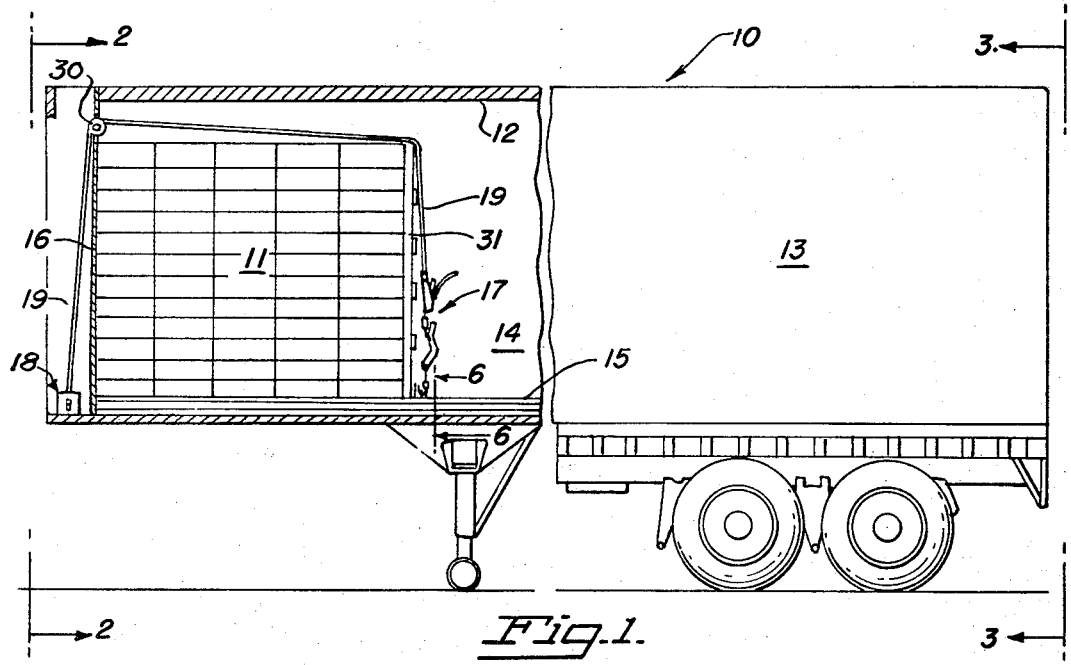
FIG. 1 is a side elevational view, with parts broken away, illustrating the preferred cargo securing means embodiment of this invention utilized for transporting a cargo in a truck-trailer.

FIG. 1 illustrates a conventional truck-trailer 10 providing a substantially closed chamber for retaining a cargo 11 comprising a plurality of filled and stacked boxes or the like. The trailer's cargo retaining chamber is preferably formed by roof 12, side walls 13 and 14, floor 15 and a front end wall 16. A second front wall has been substantially removed in FIG. 2 to more fully disclose the hereinafter discussed cargo securing means. As illustrated in FIG. 3, the trailer's tailgate or rear door members have been removed for clarification purposes.

In many transportation applications, the cargo retaining chamber is only partially filled, as illustrated by the arrangement of cargo 11 in FIG. 1. The present invention provides a cargo securing means which may be expeditiously adjusted to accommodate such cargoes by cable clamping and tensioning means, generally illustrated at 17. The cargo securing means further comprises a winch means 18 arranged to wind and unwind roll cables 19 and 20 thereon. The term cable as used herein should be understood to mean a rope, chain, belt, strap and other equivalent securing devices. Referring to FIG. 4, the winch may comprise upstanding brackets 21, 22 and 23 attached to the trailer's floor. A windup shaft 24 is rotatably mounted in the brackets by suitable bearing means.

A handle 25 may be splined or otherwise suitably secured to shaft 24 for the purpose of selectively winding or unwinding cables 19 and 20 simultaneously. A plurality of radially disposed apertures 26 may be formed in bracket 21 to facilitate reception of a pin 27 adapted to project through an aperture 28 formed in the lever portion of handle 25. Thus, the handle may be rotated to a selected position and maintained thereat by pin 27 which would be inserted manually through aperture 28 and one of underlying apertures 26.

The cables are trained (FIGS. 1 and 2) over conventional pulleys 29 and 30, suitably attached to stationary wall 16. As further illustrated, the pulleys' rotational axes are preferably tilted slightly so that they are substantially arranged perpendicular relative to their respective cables. The cables are further arranged to overlie cargo 11 and to engage top edge portions of a movable wall 31. Such top edge portions may have suitable pulleys or the like arranged thereon to reduce frictional drag on the cables. The wall may comprise standard pieces of lumber nailed or otherwise secured together to conform substantially to the rear end portion of the cargo.

Referring to FIG. 5, each cable is releasably attached to a clamping means of cargo securing means 17. The cargo securing means is further arranged to be attached to floor 15 of the trailer in a manner hereinafter described. The cable clamping means comprises a bracket 32 having a channel or eyelet portion 33 at its upper end arranged to receive the cable and guide it around a rotatable pulley 34. A lever 35 is pivotally mounted on the bracket and comprises a cam means or portion 36 arranged to be rotated clockwise and cammed into the position illustrated in FIG. 5 to secure and set the cable between the lever and pulley 34 at a predetermined length.

Conversely, counterclockwise rotation of lever 34 about its pivot will function to release the cable to permit a shortening or lengthening of the cargo securing means. It should be understood that the cam portion of lever 35 may have serrations or the like formed thereon in order to afford means for positively gripping the cable. Also, the cam portion of the lever could be arranged to co-act with a plate portion of bracket 32 directly rather than with pulley 34 for cable clamping purposes.

The clamping means may be linked by a chain 37 to cable tensioning means 17, preferably comprising an over-center toggle mechanism having a link 38 pivoitally mounted to a lever or handle member 39 by pin 40. It should be noted that pivot pin 40 is arranged so that counterclockwise rotation of the handle thereabout will function to move pivot pin 40 below and slightly to the right of a pivot 41 which attaches a cable 42 and hook 43 to the floor of the trailer. Such an "over-center" relationship of the two pivot pins will function to place and maintain cable 19 under a predetermined tension.

Referring to FIG. 6, hook 43 engages an adjustable means comprising a bracket 44 mounted on rollers 45 and 46 by suitably arranged pivot pins 47 and 48, respectively. The rollers are retained and mounted for simultaneous longitudinal movement in spaced guide means 49, preferably I-beams, secured to floor 15 of the trailer. Thus, bracket 44 may be guided and moved longitudinally along the floor of the trailer in order to position and adapt the cargo securing means for retention of various cargo arrangements.

It should be uderstood that the above described embodiment can be modified without departing from the scope of this invention. For example, in certain transportation applications one cargo securing means could be utilized rather than two. In such a case, the single cable could be centrally disposed in FIG. 2, for example. Also more than two cargo securing means could be employed. Another variation could comprise one wherein one or more cables alone retain the load with or without a cooperating movable wall or walls, i.e., stationary wall 16 would not be utilized in such an application.

Figure 2:
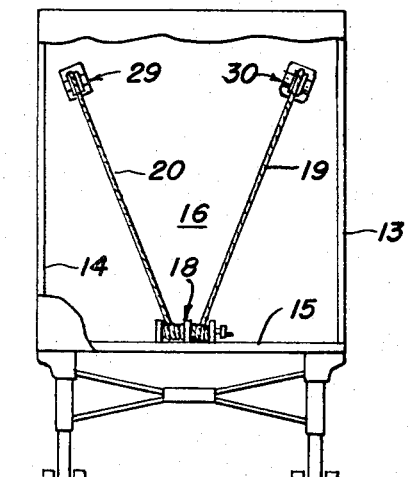
FIG. 2 is a front elevational view taken in the direction of arrows 2—2 in FIG. 1 with a front panel of the trailer broken-away for clarification purposes.
Figure 3:
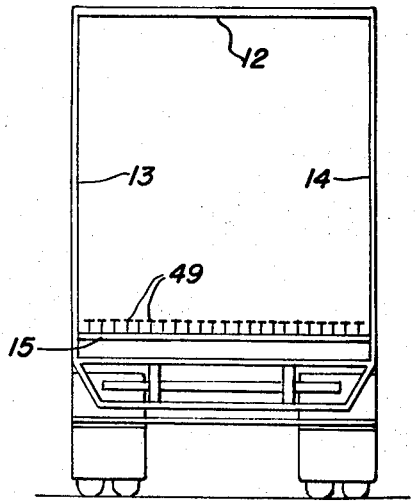
FIG. 3 is an end elevational view taken in the direction of arrows 3—3 in FIG. 1 with the trailer's tail gate removed for clarification purposes.

In addition, one or more cargo securing means could be orientated differently than the ones illustrated in FIGS. 1 and 2, i.e., transversely relative to the longitudinal axis of trailer 10, parallel to floor 15, etc. The latter cargo securing means could be substituted in lieu of the ones illustrated in the drawings or arranged to supplement them. Furthermore, certain structural changes such as a reversal in the relative vertical arrangement existing between clamping means 32 and toggle mechanism 38–39 (FIG. 5). Also, winch 18 could be secured to ceiling 12 rather than mounted on floor 15 without departing from the spirit and scope of the invention disclosed and claimed herein.

In operation, cables 19 and 20 are unwound from winch 18 and draped over cargo 11. Bracket 44 is moved longitudinally along floor 15 on rollers 45. Movable wall 31 is vertically disposed and positioned against the rear side of cargo 11, as illustrated in FIG. 1. The cables are then pulled through eyelets 33 of clamping and tensioning means 17 (one illustrated in FIG. 5). Pin 27 is then inserted through aperture 28 in handle 25 of the winch and into one of the underlying apertures 26 to prevent further unraveling of the cables.

Levers 35 are rotated clockwise about their respective pivots to set the cables at a predetermined length and place them under a first tension. Levers 39 are rotated counterclockwise about pivots 40 to move each pivot below and slightly to the right of their respective pivots 40 (FIG. 4), i.e., into over-center relationship therewith. Thus, the cables are placed under a second tension greater than the above-mentioned first tension to hold and compress the cargo firmly between movable wall 31 and stationary wall 16 to prevent shifting and/or breakage thereof. Once transport of such cargo is completed, the above procedure is reversed for unloading purposes.

What is claimed is:
1. In a transport vehicle comprising a floor, a cargo arranged on said floor and at least one cargo securing means having its ends attached to said vehicle for securing said cargo in said vehicle, the invention wherein said cargo securing means comprises at least one cable arranged to at least partially surround said cargo, clamping means releasably connected to said cable for setting said cable at a predetermined length and for placing said cable under a first tension, said clamping means comprising a pulley having said cable releasably trained therearound and a lever having a cam means formed thereon cooperating with said pulley for clamping said cable to set it at said predetermined length and tensioning means connected to said clamping means for placing said cable under a second tension greater than said first tension to secure said cargo during transportation thereof.

2. The invention of claim 1 wherein said tensioning means comprises an over-center toggle mechanism including a handle arranged to be actuated to place said cable under said second tension.

3. The invention of claim 1 further comprising adjustable means connecting said cable to said floor and guide means secured to said floor for retaining and guiding said adjustable means for movement thereon.

4. The invention of claim 1 further comprising a movable wall positioned vertically relative to said floor and against a rear side of said cargo, said cable arranged to compress said movable wall against said cargo.

5. The invention of claim 1 further comprising an end wall vertically disposed relative to said floor and secured thereto, said cargo positioned between said end wall and said movable wall.

6. The invention of claim 5 further comprising winch means mounted in said vehicle for selectively winding and unwinding said cable thereon.

7. A cargo securing means adapted to be arranged to secure a cargo in a transport vehicle comprising a cable, clamping means releasably connected to said cable for setting said cable at a predetermined length and for placing said cable under a first tension, said clamping means comprising a pulley having said cable releasably trained therearound and a lever having cam means formed thereon cooperating with said pulley for clamping said cable to set it at said predetermined length and tensioning means connected to said clamping means for placing said cable under a second tension greater than said first tension for cargo securing purposes.

8. The invention of claim 7 wherein said tensioning means comprises an over-center toggle mechanism including a handle arranged to be actuated to place said cable under said second tension.

References Cited

UNITED STATES PATENTS

| 2,051,330 | 8/1936 | Cooper | 24—134 |
| 2,760,445 | 8/1956 | Becket | 105—376 |
| 2,947,514 | 8/1960 | Goss | 254—78 |

BENJAMIN HERSH, *Primary Examiner.*

R. SONG, *Assistant Examiner.*

U.S. Cl. X.R.

24—134